(12) United States Patent
Abdellatif et al.

(10) Patent No.: US 10,239,347 B2
(45) Date of Patent: Mar. 26, 2019

(54) MAGNETIC OMNI-WHEEL WITH ROLLER BRACKET

(71) Applicants: Saudi Arabian Oil Company, Dhahran (SA); HiBot Corporation, Meguro-ku, Tokyo (JP)

(72) Inventors: Fadl Abdellatif, Thuwal (SA); Shigeo Hirose, Tokyo (JP); Michele Guarnieri, Tokyo (JP); Paulo Debenest, Tokyo (JP); Ali Outa, New York, NY (US); Brian Parrott, Thuwal (SA)

(73) Assignees: Saudi Arabian Oil Company, Dhahran (SA); HiBot Corporation, Tokyo (JP)

( * ) Notice: Subject to any disclaimer, the term of this patent is extended or adjusted under 35 U.S.C. 154(b) by 56 days.

(21) Appl. No.: 15/158,287

(22) Filed: May 18, 2016

(65) Prior Publication Data
US 2017/0334241 A1 Nov. 23, 2017

(51) Int. Cl.
*B60B 19/00* (2006.01)
*B08B 9/049* (2006.01)
*F16L 55/28* (2006.01)

(52) U.S. Cl.
CPC .......... *B60B 19/003* (2013.01); *B60B 19/006* (2013.01); *B08B 9/049* (2013.01); *B60B 2900/112* (2013.01); *B60B 2900/351* (2013.01); *B60B 2900/551* (2013.01); *B60Y 2200/47* (2013.01); *F16L 55/28* (2013.01)

(58) Field of Classification Search
CPC ...... B60B 19/003; B60B 19/006; B60B 19/12
See application file for complete search history.

(56) References Cited

U.S. PATENT DOCUMENTS

| | | | |
|---|---|---|---|
| 2,694,164 A * | 11/1954 | Geppelt | H01F 7/0252 219/158 |
| 3,253,632 A | 5/1966 | Dalrymple | |
| 3,697,720 A * | 10/1972 | Christopher | B23K 13/00 219/161 |
| 3,872,940 A | 3/1975 | Gambini | |
| 5,383,715 A | 1/1995 | Homma et al. | |
| 5,388,528 A * | 2/1995 | Pelrine | B62D 49/04 104/138.2 |
| 2003/0037410 A1 | 2/2003 | Yamaguchi et al. | |
| 2006/0162610 A1* | 7/2006 | Reboredo Losada | B60B 3/048 104/138.1 |

(Continued)

FOREIGN PATENT DOCUMENTS

| | | | |
|---|---|---|---|
| CN | 202 622 792 | | 12/2012 |
| CN | 202622792 U | * | 12/2012 |

(Continued)

*Primary Examiner* — Kip T Kotter
(74) *Attorney, Agent, or Firm* — Leason Ellis LLP (57) ABSTRACT

A multidirectional wheel for traversing a surface is provided that includes a magnet and a plurality of rollers disposed around an outer periphery of each of the hubs of the wheels. The rollers are mounted for rotation in a second axial direction that is perpendicular to a first axial direction of the wheel. The rollers are supported by a plurality of magnetically-inducible brackets attached to the hub. The brackets are optimally sized and shaped to reduce the space between the magnetized materials of the wheel and the surface upon which the wheel travels.

20 Claims, 10 Drawing Sheets

(56) References Cited

U.S. PATENT DOCUMENTS

| | | | |
|---|---|---|---|
| 2010/0156168 A1* | 6/2010 | Scogna | B60B 19/003 301/5.23 |
| 2011/0011299 A1* | 1/2011 | Beck | B60B 19/003 104/138.2 |
| 2012/0200380 A1* | 8/2012 | Kocijan | B60L 13/04 335/306 |
| 2014/0152803 A1* | 6/2014 | Carlson | G01N 21/954 348/84 |
| 2015/0129327 A1 | 5/2015 | Yoshino et al. | |
| 2015/0151572 A1* | 6/2015 | Parrott | B60B 19/12 301/5.23 |
| 2015/0151797 A1* | 6/2015 | Outa | B62D 53/02 180/20 |
| 2015/0153312 A1* | 6/2015 | Gonzalez | G01D 5/00 73/23.2 |
| 2016/0266049 A1* | 9/2016 | Carlson | G01N 21/954 |

FOREIGN PATENT DOCUMENTS

| | | |
|---|---|---|
| EP | 0 556 401 | 8/1993 |
| JP | 2007022342 A * | 2/2007 |

* cited by examiner

MAGNETIC OMNI-WHEEL WITH ROLLER BRACKET

FIELD OF THE INVENTION

The present invention relates to omni-wheels, and in particular, to magnetic omni-wheels having roller brackets with optimized characteristics for supporting rollers that traverse a surface.

BACKGROUND OF THE INVENTION

Wheels having differing designs are known in various documents, including, among others, U.S. Pat. No. 8,308,604 entitled "Omni-wheel based driving device with belt transmission mechanism;" U.S. Pat. Pub. No. 2008/0295595 entitled "Dynamically balanced in-line wheel vehicle;" U.S. Pat. No. 7,233,221 entitled "Magnetic wheel for vehicles;" U. S. Pat. Pub. No. 2012/0200380 entitled "Magnetic wheel;" and an article by Lee, Seung-heui, et. al. entitled "Recognition of Corrosion State Based on Omnidirectional Mobile Robot for Inspection of CAS for Oil Tanker Annual Conference 2008." The specific designs and features of the wheels and vehicles described in these documents can best be appreciated by a review of their respective disclosures.

SUMMARY OF THE INVENTION

According to an aspect of the present invention, a multidirectional wheel for traversing a surface having a contour is provided. The wheel includes at least one hub, the at least one hub defining a first axial direction of rotation. The wheel includes at least one magnet, the at least one magnet having an outer face arranged to generally circumscribe the first axial direction, wherein the hub is made of a magnetically inducible material which directs the flux of the at least one magnet toward the surface being traversed. The hub is made of a magnetically inducible material which directs the flux of the at least one magnet toward the surface being traversed. The wheel includes a plurality of magnetically-inducible brackets disposed around an entirety of an outer periphery of the at least one hub. The brackets are sized and shaped to define a wheel profile that complements the contour of the surface such that the size of the gap is reduced as compared to a wheel profile that does not complement the contour of the surface at each rotational position of the wheel. The wheel also includes a plurality of rollers supported for rotation by the plurality of brackets. The rollers are supported by the brackets for rotation in a second axial direction that is at an angle to the first axial direction. At least one roller contacts the surface in any rotational position of the wheel as the wheel traverses the surface while defining a gap between the surface and the outer face of the magnet.

In accordance with a further aspect, the brackets are sized and shaped to define a convex wheel profile.

In accordance with yet a further aspect, the brackets include a tapered portion.

In accordance with a further aspect, the brackets are sized and shaped to define a flat wheel profile.

In accordance with yet a further aspect, the brackets include a flat portion.

In accordance with a further aspect, the brackets are sized and shaped to define a concave wheel profile.

In accordance with yet a further aspect, the brackets include a protrusion portion.

In accordance with a further aspect, the wheel profile complements the contour of the surface according to the following combinations: (1) the wheel profile is convex and the surface contour is concave; (2) the wheel profile is flat and the surface contour is flat; and (3) the wheel profile is concave and the surface contour is convex.

In accordance with a further aspect, the brackets include a mount that supports the roller and a protrusion.

In accordance with a yet further aspect, the protrusion is lobe shaped.

In accordance with a further aspect, the protrusion is flat shaped.

In accordance with a further aspect, the protrusion is taper shaped.

In accordance with a yet further aspect, there are two hubs that define the first axial direction of rotation and the at least one magnetic comprises a disk disposed between the two hubs.

In accordance with a yet further aspect, the brackets are disposed about each of the two hubs.

In accordance with a further aspect, the brackets that are disposed about each of the two hubs, the hubs, and the magnetic collectively define a concave profile.

In accordance with a further aspect, the brackets that are disposed about each of the two hubs, the hubs, and the magnetic collectively define a convex profile.

In accordance with a further aspect, the brackets that are disposed about each of the two hubs, the hubs, and the magnetic collectively define a flat profile.

In accordance with a yet further aspect, the wheel includes a motor wherein at least one of the two hubs is operationally coupled to the motor for driven rotation.

In accordance with a further aspect, an axle is operationally coupled to the motor and the at least one of the two hubs.

DETAILED DESCRIPTION OF CERTAIN EMBODIMENTS

Figure 1A:
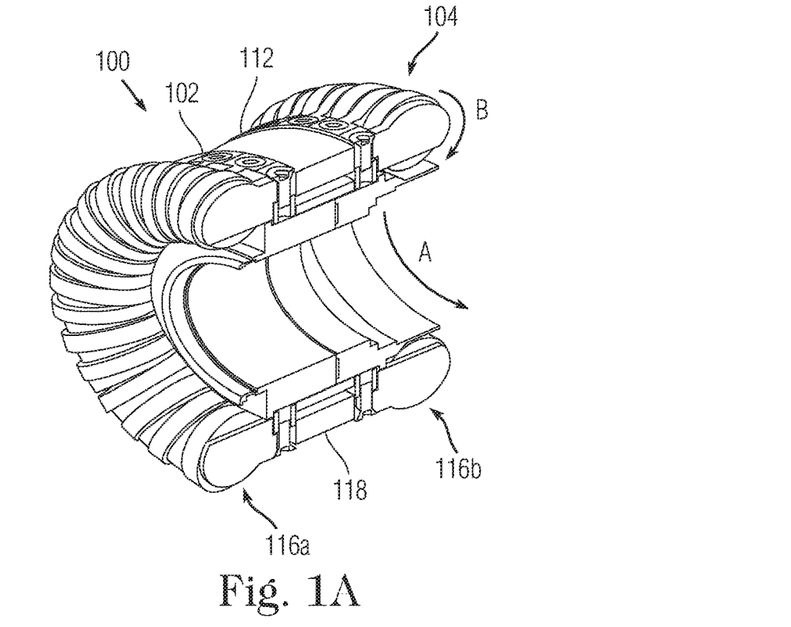
FIG. 1A illustrates a sectional view of a magnetic omni-wheel according to a first arrangement.
Figure 1B:
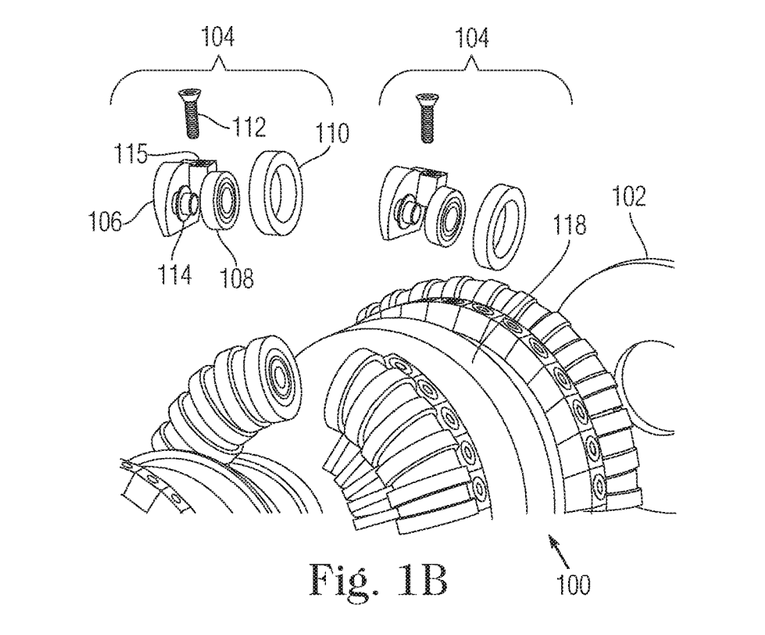
FIG. 1B illustrates an exploded view of the magnetic omni-wheel of FIG. 1A.
Figure 2A:
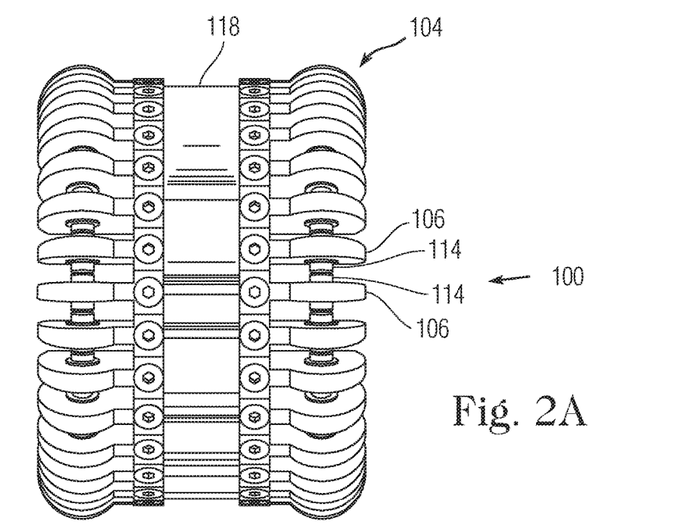
FIG. 2A illustrates a front view of a magnetic omni-wheel according to a second arrangement.
Figure 2B:
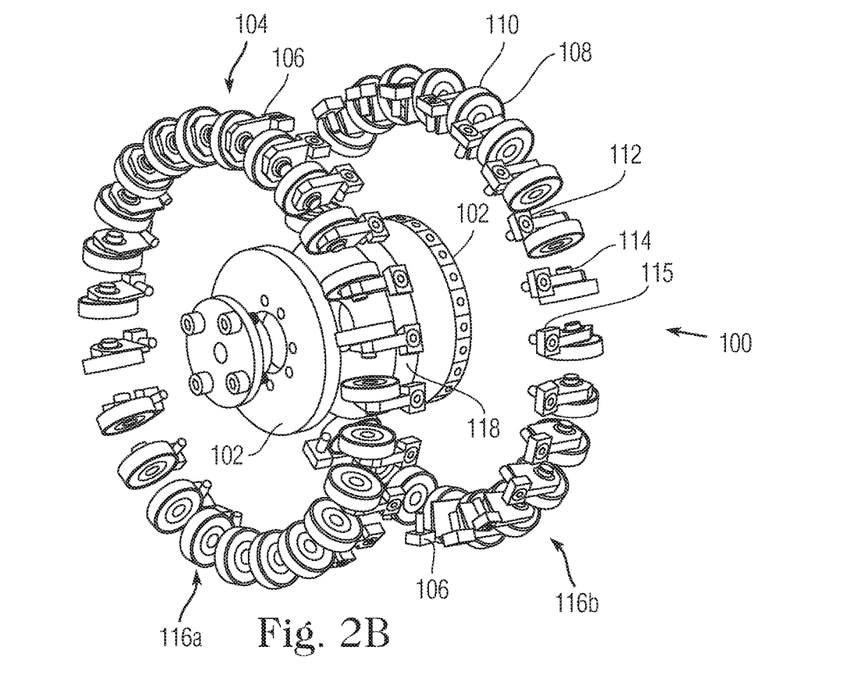
FIG. 2B illustrates an exploded view of the magnetic omni-wheel of FIG. 2A.
Figure 3A:
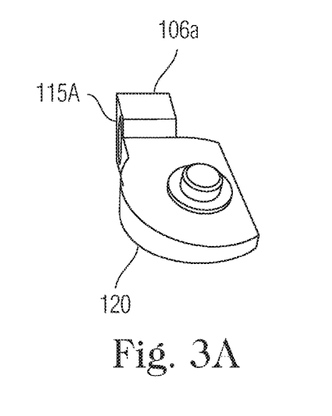
FIG. 3A is an isometric view of a bracket for a magnetic omni-wheel.
Figure 3B:
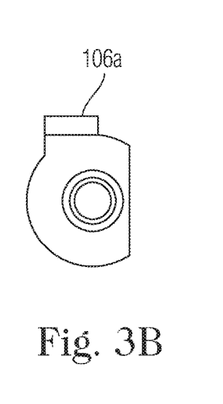
FIG. 3B is a plan view of the bracket of FIG. 3A.
Figure 3C:
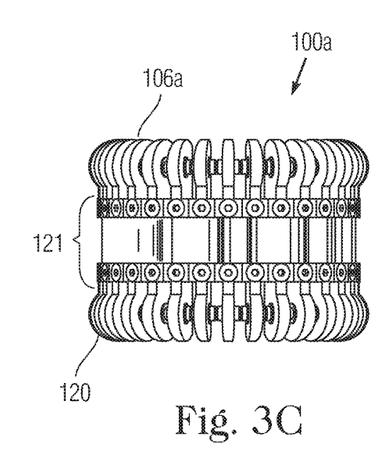
FIG. 3C is a plan view of a magnetic omni-wheel having a set of brackets as in FIG. 3A.
Figure 3D:
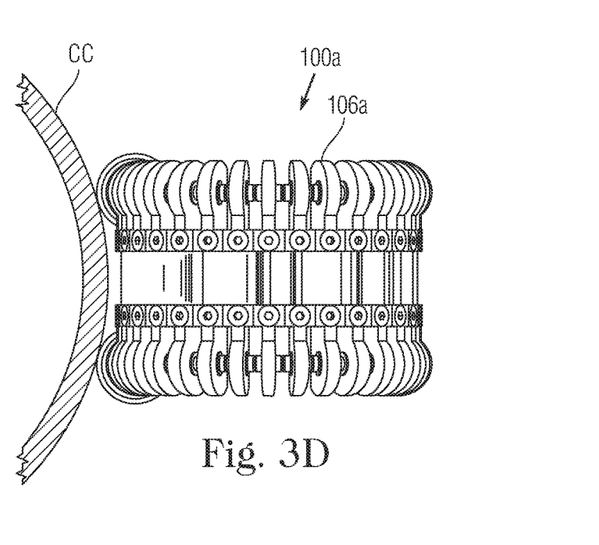
FIG. 3D is a plan view of the magnetic omni-wheel of FIG. 3C traversing a surface.
Figure 4A:
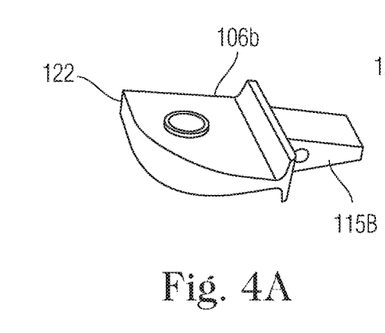
FIG. 4A is an isometric view of a bracket for a magnetic omni-wheel.
Figure 4B:
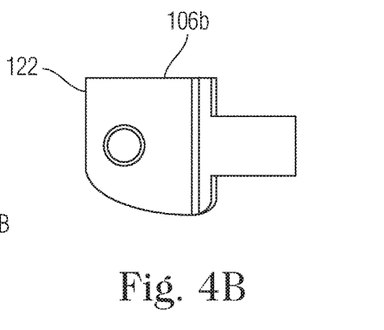
FIG. 4B is a plan view of the bracket of FIG. 4A.
Figure 4C:
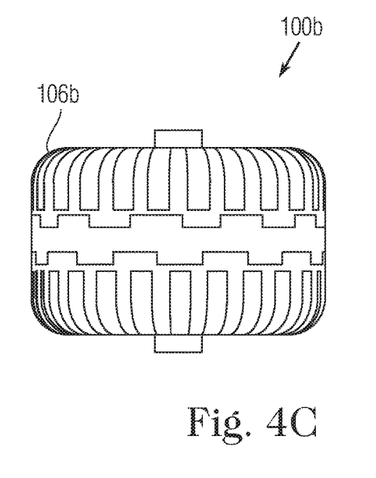
FIG. 4C is a plan view of a magnetic omni-wheel having a set of brackets as in FIG. 4A.
Figure 4D:
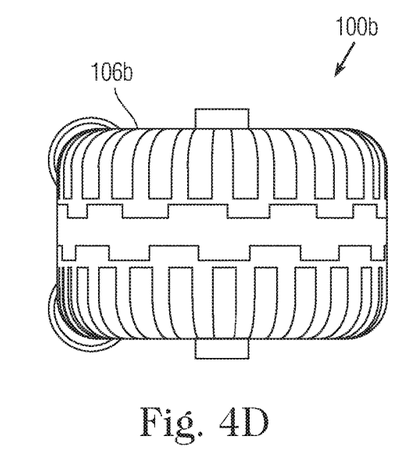
FIG. 4D is a plan view of the magnetic omni-wheel of FIG. 4C traversing a surface.
Figure 5A:
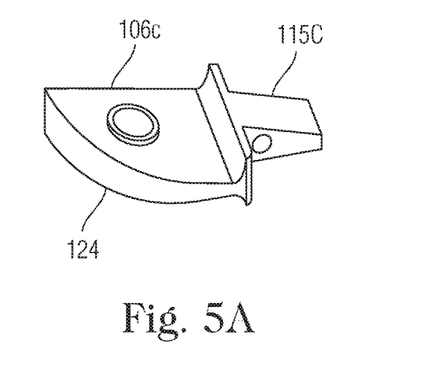
FIG. 5A is an isometric view of a bracket for a magnetic omni-wheel.
Figure 5B:
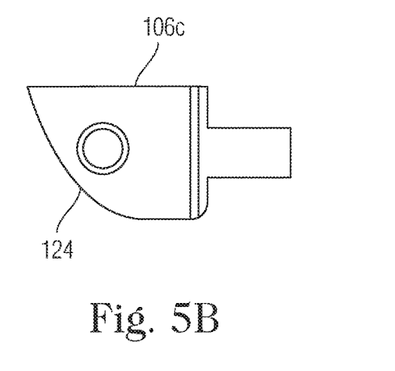
FIG. 5B is a plan view of the bracket of FIG. 5A.
Figure 5C:
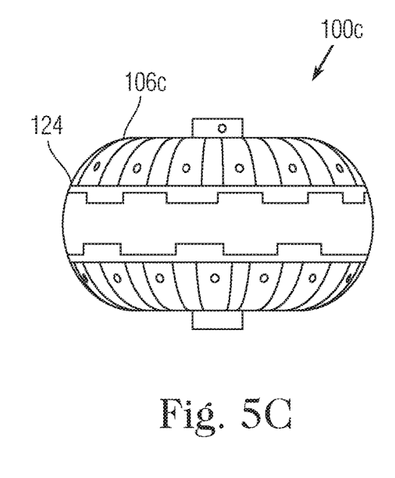
FIG. 5C is a plan view of a magnetic omni-wheel having a set of brackets as in FIG. 5A.

Referring to FIGS. 1A, 1B, and 2B, a magnetic omni-wheel 100 is shown. The omni-wheel 100 includes a hub or yoke 102 and a plurality of roller modules 104 arranged around the outer periphery of the hub 102. The roller modules 104 are arranged to support rollers perpendicular to the direction of axial rotation of the hub 102. FIG. 1B shows two adjacent roller modules 104 on one side of the omni-wheel in an exploded condition. FIG. 2B shows both sides of the magnetic omni-wheel in an exploded condition. Each roller module includes a bracket 106, a bearing 108, a roller 110, and a fastener 112 that couples the bracket 106 to the hub 102. Each bracket 106 includes a protruding mount 114 on each side of the bracket 106 and an anchor portion 115. The anchor portion 115 (see 115A in FIG. 3A; 115B in FIG. 4A; and 115C in FIG. 5A) includes a hole that is sized and shaped to receive the fastener 112 so that the bracket can be secured to the hub. Each mount 114 is sized and shaped so that an adjacent bearing 108 can be supported thereon. Accordingly, adjacent brackets provide two opposing mounts to support a bearing 108 and roller 110 therebetween, as can be seen in FIGS. 1A and 2A (the rollers are omitted from FIG. 2A for ease of illustration to show that adjacent mounts are in close proximity to support a bearing and roller). The bearing 108 and roller 110 are sized and shaped so that the roller 110 can be supported on the bearing 108 and so that the roller is free to rotate about an axis of the mount 114.

The magnetic omni-wheel 100 can have a two-sided configuration in that a first side 116a and a second side 116b of the omni-wheel 100 is provided with a hub 102 on each side of the omni-wheel with roller modules 104 disposed around the periphery of each hub. A magnet 118 is disposed between the two hubs 102 and two sets of roller modules 104 to provide attraction to the surface being traversed by the omni-wheel 100. Preferably, each hub is made of a magnetically inducible material (e.g., ferromagnetic material or iron) so that it can direct the magnetic flux from the magnet 118, as discussed in more detail below.

The rollers 110 can be made of a material or be provide with a surface texture (e.g., rubber, soft plastic, or surface textured steel, etc.) to provide a coefficient of friction that is sufficient for the wheel 100 to maintain traction so that it can drive/steer a vehicle in a vertical and/or upside-down orientation when the weight of the vehicle counteracts the normal force provided by the magnet 118, as discussed in more detail below. This arrangement in which increased traction is provided allows the force required to be produced by the magnet to be reduced. Accordingly, the size and weight of the magnet can be reduced and/or less costly magnetic materials can be used. This increases the efficiency when the vehicle travels in a right-side-up orientation (e.g., less weight).

Referring to FIG. 1A, the hub 102 permits rotation in the direction indicated by the arrow "A" about the axis of the hub that defines a first axial direction. The rollers 110 permit rotation in the direction indicated by arrow "B" that is in a second axial direction perpendicular to the first axial direction. (Alternatively, Mecanun type wheels can be used instead, in which case the rollers are typically mounted at 45° relative to the hub). As such, the omni-wheel permits rotation with two degrees of freedom. This arrangement is particularly useful for vehicles that must operate in tight confines, such as robotic vehicles used to inspect pipes, tanks, and other metallic structures.

The magnet 118, which can be a ring, disk, or a plurality of individual magnets, provides a magnetic flux force and the material, size/number, and strength of the magnet(s) are selected so as to hold the omni-wheel in contact with a magnetically inducible material (e.g., a steel tank or pipe wall). In addition, magnetically inducible hubs 102 are placed on the sides of the magnet 118 in order to further direct the magnetic flux force from the magnet 118 toward a magnetically inducible surface on which the omni-wheel travels, thereby increasing the attractive force between the wheel and the surface. Thus, the wheel provides a stronger pull force in the direction of a magnetically inducible surface on which the wheel is to move via the magnet 118 and hubs 102, while simultaneously allowing two degrees of freedom of movement of the wheel along the surface via rotation of the hub 102 and the rollers 110.

In addition, the brackets 106 that support the rollers 110 can be made of a magnetically inducible material. The coupling of the attractive force between the magnet (118) through the hub (102), as discussed above, is further extended towards the surface through the magnetically inducible material forming the brackets (106). As such, the brackets 106 can assist in directing the magnetic flux from the magnet 118 towards the traveling surface. This arrangement results in a stronger holding force of the wheel towards the magnetically inducible surface on which it is attached.

Referring to FIGS. 3-5, the brackets can be shaped to improve the directing of the magnetic flux towards the traveling surface which increases the attractive force between the wheel and the surface. FIG. 3A-3D illustrate a wheel 100a with a bracket 106a that includes a protrusion 120. The protrusion 120 is lobed shaped such that it extends away from the outer face of the magnet when the bracket is attached to the hub of the wheel and towards the surface when the wheel is located on a surface. The lobe shaped protrusion 120 alters the profile of the bracket 106a such that the bracket extends toward the surface and away from the hub and magnet of the wheel. As such, the brackets 106a when seated on both sides of the wheel define a recess 121 between the brackets. The non-symmetrical shape of the bracket 106a can be seen clearly in FIG. 3B. A front plan view is shown with the anchor portion 115 defining the top in the view. As can be discerned, the left side of the bracket is formed by the lobe-shaped protrusion 120 while the right side of the bracket forms a straight edge. Thus, if a vertical line were drawn from the anchor portion 115 through the horizontal center (or near the center) of the bracket, the two sides on either side of the vertical line would have different shapes. Other brackets take different forms (e.g., as shown in FIGS. 4A, 4B, 5A and 5B) but share this non-symmetrical feature. The brackets 106a can be arranged on each side of the wheel such that each side of the wheel is a mirror image of the other. It is also practical to arrange the brackets such that the rollers are arranged in an opposite phase, depending on the desired motion of the wheel. If the height of the axle relative to the surface is more critical than side-to-side wobble, an out of phase arrangement is desirable. Alternatively, if wobble is more detrimental to operation than changing axle height as the wheel moves between resting points (consisting of a place where 4 rollers are engaged with the surface), the rollers should be arranged to be in phase, creating an axis of symmetry through the magnet. The lobe shaped protrusion of the bracket extends above the plane of the outer surface of the magnet 118, but stay within the curvature of the roller (110). The protrusions of the brackets define a concave profile of the wheel. Accordingly, when the wheel is traveling on a surface that has a convex contour A (e.g., the exterior of a round pipe) the air gap between an outer face magnet 118 and the surface is reduced, as can be seen in FIG. 3D. The reduction of gap between the outer face of the magnet 118 and the surface can further be see in FIG. 6, which provides a comparison of the gap produced by a wheel having a flat profile and a wheel having a concave profile when the wheel is traveling on a surface having a convex contour. The brackets 106a are sized and shaped such to reduce the air gap between the surface and the wheel without any part of the wheel contacting the surface other than the rollers. The brackets are sized and shaped, along with the rollers supported by the brackets, such that the brackets and the magnet do not contact the surface and an air gap is maintained. This structural arrangement permits the magnetically inducible material of the wheel to be as close to the surface as possible while retaining the separation of the north and south poles across the wheel/magnet. The structure of the brackets increases the efficiency of the pull force between the wheel and the surface by providing brackets that are sized and shaped to correspond to the surface upon which the wheel will is traveling such that the air gap is reduced. As such, the air gap is reduced for concave, convex, and flat configurations.

Referring to FIGS. 4A-4D, a wheel 100b has brackets 106b that have a flat profile. The brackets 106b have a protrusion 122. The protrusion 122 is flat shaped such that it extends generally parallel with respect to the outer face of the magnet when the bracket is attached to the hub of the wheel. The flat shaped protrusion 122 alters the profile of the bracket 106b such that the bracket neither extends toward or away from the hub and magnet of the wheel. This arrangement results in the roller being disposed outside the outer layer of the magnet/case holding the magnet, and the bracket is just within the curvature of the roller. Accordingly, there is a small separation between the body of magnetically inducible material (magnet, hubs, and brackets) and the flat surface being traversed. The substantially flat area between the contact points of the rollers (to keep the magnet and hubs close), and brackets that follow that roller profile to ensure that the brackets are also as close to the surface as possible, provide for an improved holding force. The brackets 106b can be arranged on each side of the wheel such that each side of the wheel is a mirror image of the other. The flat shaped protrusion of the bracket is on the same plane of the outer surface of the magnet 118. Accordingly, wheel having brackets 106b reduces the air gap between the outer face of magnet 118 and a traveling surface having a flat contour. As such, the wheel having a flat profile has an increased magnetic attractive pull force between the wheel and the flat traveling surface as a result of the reduced air gap and increased magnetic flux.

Figure 5D:
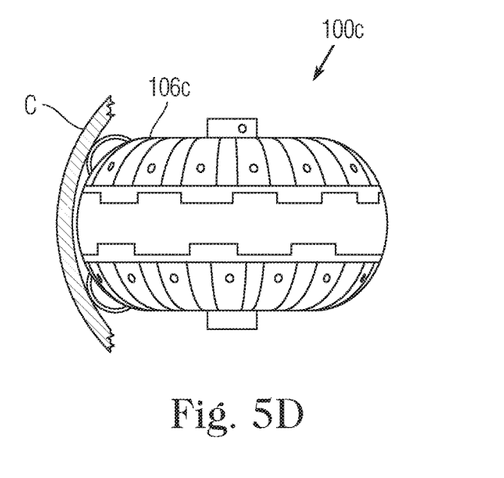
FIG. 5D is a plan view of the magnetic omni-wheel of FIG. 5C traversing a surface.
Figure 6A:
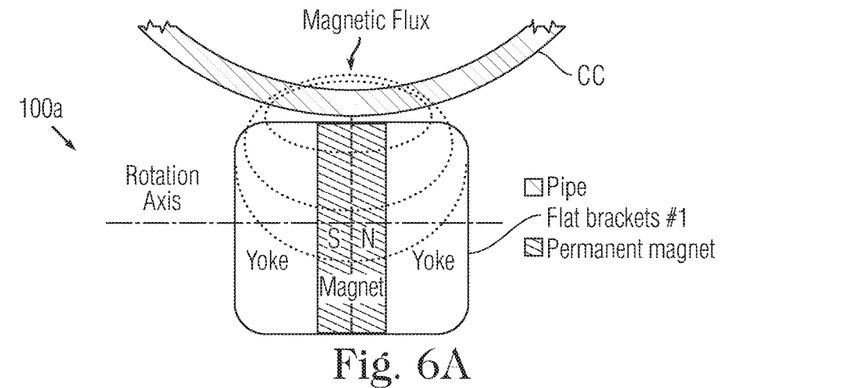
FIG. 6A is a plan view of a first embodiment of a magnetic omni wheel with flat brackets in relation to a surface.
Figure 6B:
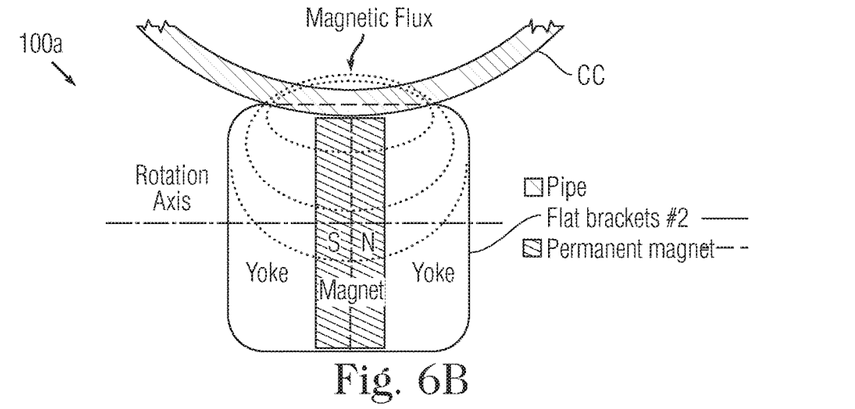
FIG. 6B is a plan view of a second embodiment of a magnetic omni wheel with larger flat brackets in relation to a surface.
Figure 6C:
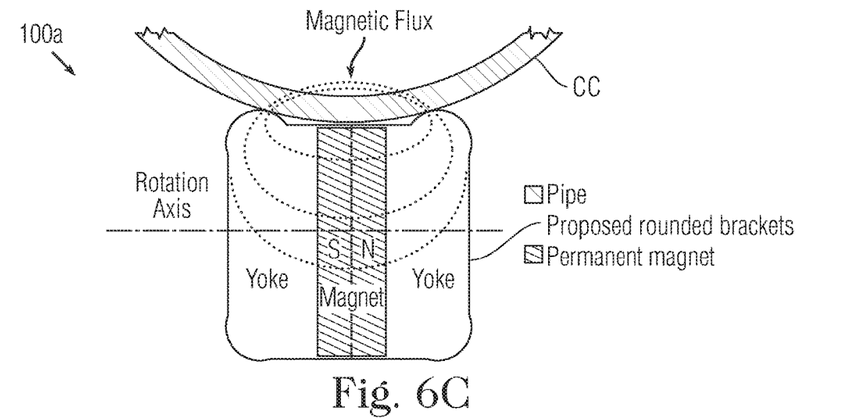
FIG. 6C is a plan view of a third embodiment showing a magnetic omni wheel with flat protruding brackets in relation to a surface.

Referring to FIG. 5A-5D, a wheel 100c has brackets 106c that include a protrusion 124. The protrusion 124 is taper shaped such that it extends away from the outer face of the magnet when the bracket is attached to the hub of the wheel and away from the surface when the wheel is located on a surface. The taper shaped protrusion 124 alters the profile of the bracket 106c such that the bracket extends away from the hub and magnet of the wheel. As such, the brackets 106c when seated on both sides of the wheel permit the outer face of the magnet to bulge outwardly with respect to the brackets. The brackets 106b can be arranged on each side of the wheel such that each side of the wheel is a mirror image of the other. The taper shaped protrusion of the bracket extends below the plane of the outer surface of the magnet 118. The taper 124 alters the profile of the bracket 106c such that the bracket curves in a direction toward the hub and magnet of the wheel. As such, the brackets 106c on both sides of the wheel define a convex profile of the wheel. Accordingly, when the wheel is traveling on a surface that has a concave contour C (e.g., the interior of a round pipe) the air gap between an outer face of magnet 118 and the surface is reduced, as can be seen in FIG. 5D. The brackets 106c are sized and shaped such to reduce the air gap between the surface and the wheel without the wheel contacting the surface. The structure of the brackets increases the efficiency of the pull force between the wheel and the surface by providing brackets that are sized and shaped to correspond to the surface upon which the wheel will is traveling such that the air gap is reduced.

Referring to FIGS. 7A-7D, one means of determining the size and shape of the wheel that is adapted to a particular surface (FIGS. 7A&B=convex and FIGS. 7C&D=concave) is shown and described as follows. FIGS. 7A-7D show a circular cross-section as the target contact surface, which could for example correspond to a pipe's cross-section that is normal to its centerline, meaning the wheel is optimized for the condition in which the inspection robot is driving circumferentially around that specific pipe diameter. It should be understood though, that these concepts can be applied to different cross-sections, for example to an elliptical cross-section corresponding to a pipe's cross-section that is at an angle with respect to its centerline or to a non-cylindrical pipe.

Figure 7A:
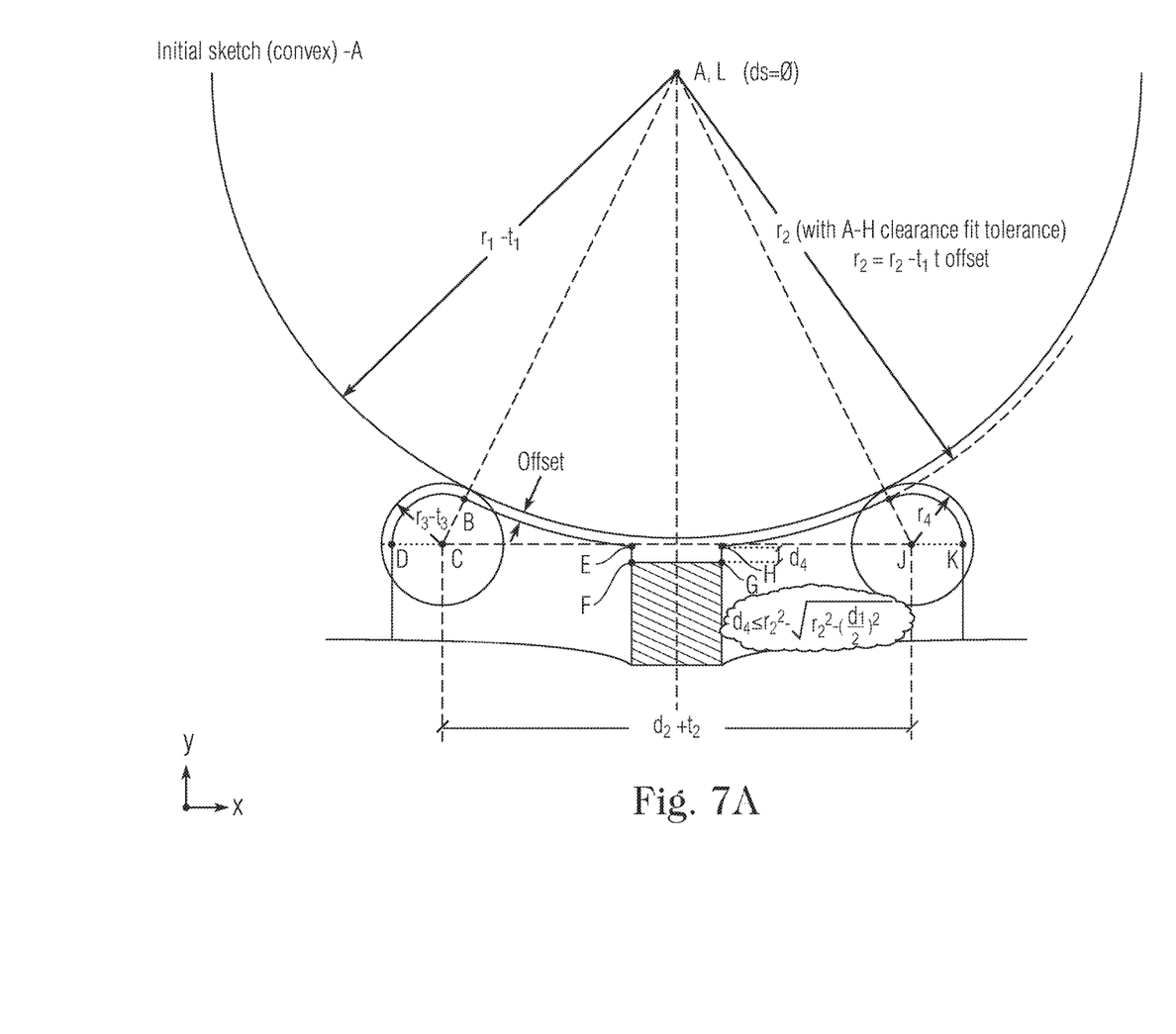
FIG. 7A is a schematic view of a magnetic omni-wheel having an arrangement that complements a convex surface.
Figure 7B:
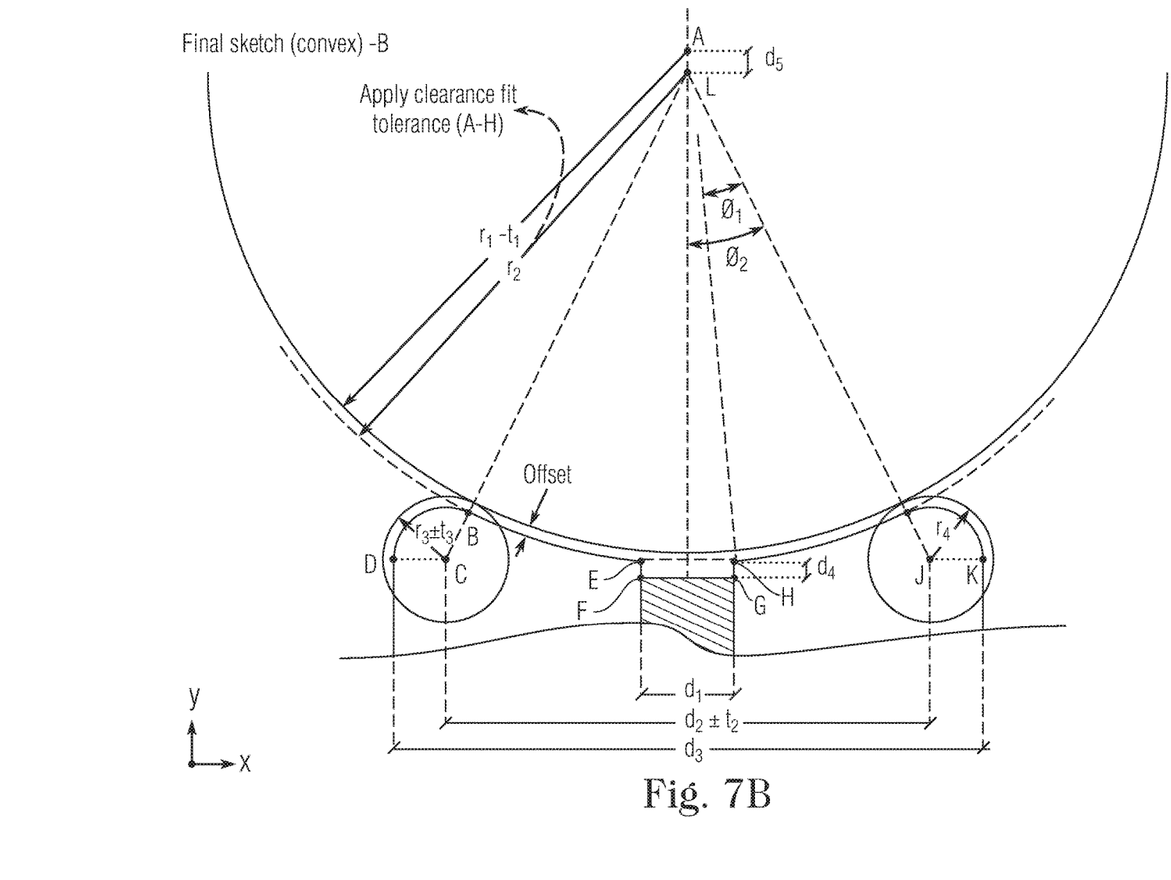
FIG. 7B is a further schematic view of a magnetic omni-wheel having an arrangement that complements a convex surface.
Figure 7C:
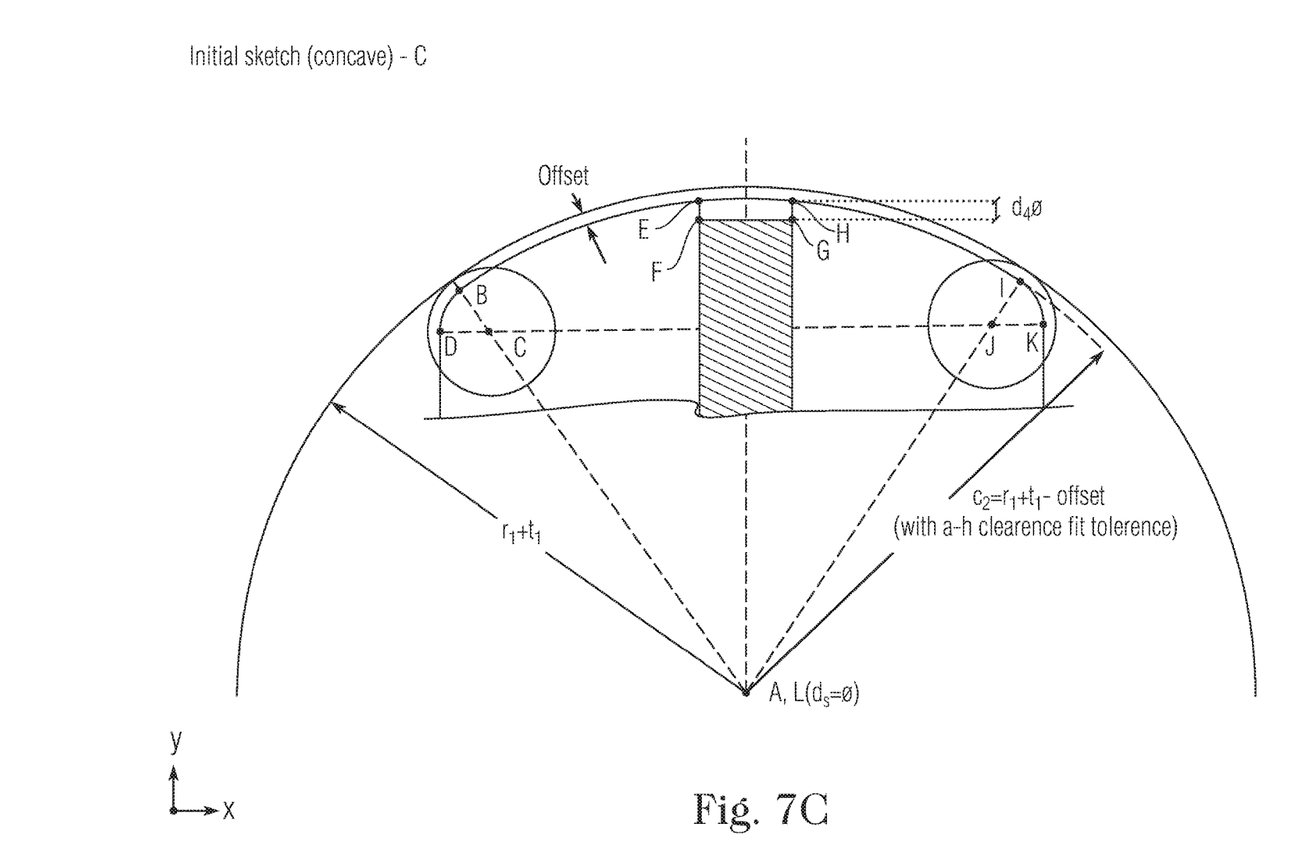
FIG. 7C is a schematic view of a magnetic omni-wheel having an arrangement that complements a concave surface.

Referring to FIGS. 7A and 7C, r1 is the radius of target curvature at the cross-section of interest, t1 is the tolerance factor for r1 (i.e. r1+/−t1), r3 is the radius of the omni-wheel roller, t3 is the tolerance factor for r1 (i.e. r1+/−t1), d1 is the magnet width, d2 is the distance between roller sets, and t2 is the tolerance factor for d2 (i.e. d2+/−d2). Once a target curvature has been selected and a specific cross-section of the traveling surface is known, and once the dimensions are known from the omni-wheel's overall design process (e.g., the distance between the 2 sets of rollers, the roller diameter, the magnet width, the magnet outer diameter, and the overall omni-wheel diameter), an offset parameter can be set. The offset parameter represents the sum of the height (measured radially) of the largest possible irregularity/protrusion that could be expected on the target surface during normal operation, plus a clearance factor which will be the minimum possible distance between the bracket and the target surface taking t1, t2, t3 and any possible protrusions into account.

The target's cross-section has a curvature of r1 and, depending on whether the target is concave or convex, a tolerance is added of +t1 for a concave target and of −t1 for a convex target. These tolerances account for possible variations while allowing the brackets to be maintained as close as possible to the surface. The 2 contact rollers are represented as circles, tangent to the target, both with a radius of r3 and with their centers separated at a distance of d2. Again, depending on the type of target, tolerances are added to r3 and d2 respectively as follows: −t3 and −t2 for concave targets, −t3 and +t2 for convex targets. Segment B-E is a curve parallel to the target's profile and offset by a constant distance of 'offset'. Accordingly, the rollers are shown at their closest possible position to the target (taking t1, t2, t3 and possible protrusion into account) and B-E segment is the curve which is closest to the target's profile while ensuring the selected clearance is kept from any possible protrusions. The value of r2 in the concave case is defined as (r2=r1+t1−offset) and should be manufactured with a shaft tolerance for clearance fit (e.g. a to h). The value of r2 in the convex case is defined as (r2=r1−t1+offset) and should be manufactured with a hole tolerance for clearance fit (e.g. A to H).

Point E is aligned with the face of the magnet which is closest to its corresponding roller and the segment E-F is collinear with the edge of that same magnet face. The E-F segment of the bracket's profile can be customized as required. In the concave case d4>=0 and in the convex case d4>=r2−sqrt(r2^2−(d1/2)^2).

The B-D segment can be defined in various ways, one example would be as an arc, concentric with its corresponding roller, and tangent to segment B-E, with a radius of r4=r3−t3−offset. The arc length of B-D and the exact placement of points B and D can be customized as required.

FIGS. 7A and 7C illustrate the interface between the omni-wheel's brackets and the target at a condition of maximum gap distance assuming tolerance variations. As discussed above, the bracket and the target's profile can be represented as parallel curves and in the case of a circular cross-section as concentric (i.e. point A and L are the same).

Figure 7D:
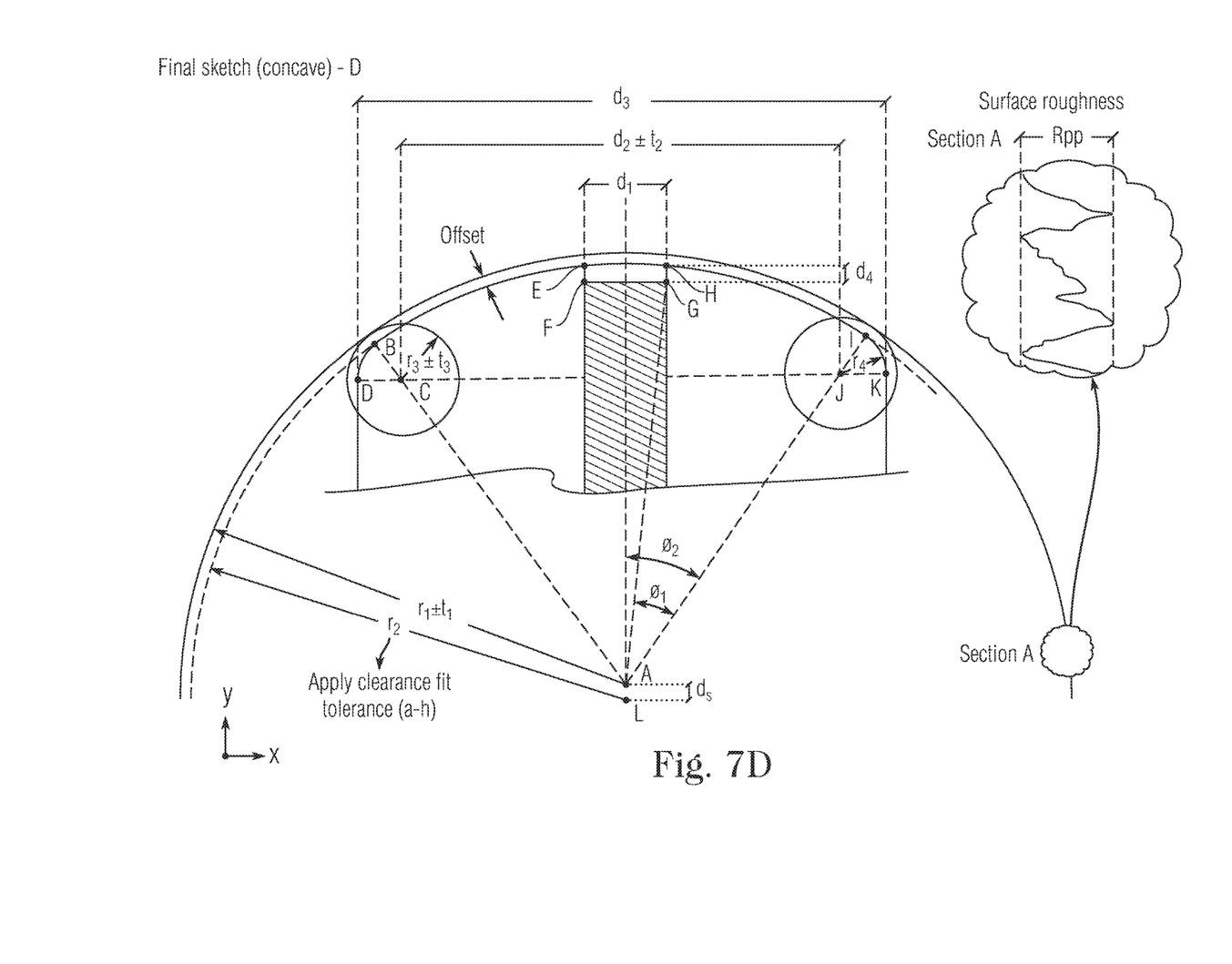
FIG. 7D is a further schematic view of a magnetic omni-wheel having an arrangement that complements a concave surface.

FIGS. 7B and 7D represent a geometry in which the dimensions are shifted to their respective nominal values which will result in point L being shifted away from point A, in the concave case away from the target and in the convex case, towards the target. FIGS. 7B and 7D represent an average clearance or air gap left between the bracket and the target upon completing the design process. Other parameters such as surface roughness could be taken into account when defining the clearance.

Accordingly, the brackets of the wheels are sized and shaped to reduce the air gap between the wheel and its magnet and the surface upon which the wheel travels. The brackets include shaped protrusion that define a profile of the wheel, wherein the profile of the wheel complements the contour of the traveling surface. Accordingly, if the surface contour is convex the wheel profile is concave such that the two complement each other and can nest with each other. if the surface contour is flat the wheel profile is flat such that the two complement each other and can nest with each other. If the surface contour is concave the wheel profile is convex such that the two complement each other and can nest with each other. Meanwhile, each embodiment has the brackets surrounding the sides of the magnet 118 while an outer face of the magnet has a more optimized gap between it and the convex, flat, or concave surfaces. In this way, the efficiency of the wheel and the pull force can be improved. In other embodiments in which the magnet 118 is not a complete ring but consists of multiple individual magnets, the brackets 106 can be provided with a lip that extends therefrom to secure the magnets against normal forces that could otherwise dislodge the magnet.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed is:

1. A multidirectional wheel for traversing a surface having a contour, comprising:
    at least one hub, the at least one hub defining a first axial direction of rotation;
    at least one magnet having an outer face arranged to generally circumscribe the first axial direction, wherein the hub is made of a magnetically inducible material which directs the flux of the at least one magnet toward the surface being traversed;
    a plurality of magnetically inducible brackets disposed around an entirety of an outer periphery of the at least one hub, each of the brackets being sized and shaped with a profile that is non-symmetric with respect to an axial plane that bisects the bracket to define a wheel profile that complements the contour of the surface such that the size of an air gap is reduced as compared to a wheel profile that does not complement the contour of the surface at each rotational position of the wheel; and
    a plurality of rollers supported for rotation by the plurality of brackets, the rollers being supported by the brackets for rotation in a second axial direction that is at an angle to the first axial direction,
    wherein at least one roller contacts the surface in any rotational position of the wheel as the wheel traverses the surface while defining the air gap between the surface and the outer face of the magnet, the hub, and the brackets.

2. The multidirectional wheel as in claim 1, wherein the brackets are sized and shaped to define a convex wheel profile.

3. The multidirectional wheel as in claim 2, wherein the brackets include a tapered portion.

4. The multidirectional wheel as in claim 1, wherein the brackets are sized and shaped to define a flat wheel profile.

5. The multidirectional wheel as in claim 4, wherein the brackets include a flat portion.

6. The multidirectional wheel as in claim 1, wherein the brackets are sized and shaped to define a concave wheel profile.

7. The multidirectional wheel as in claim 6, wherein the brackets include a protrusion portion.

8. The multidirectional wheel as in claim 1, wherein the wheel profile complements the contour of the surface according to the following combinations:
    (1) the wheel profile is convex and the surface contour is concave;
    (2) the wheel profile is flat and the surface contour is flat; and
    (3) the wheel profile is concave and the surface contour is convex.

9. The multidirectional wheel as in claim 1, wherein the brackets include a mount that supports the roller and a protrusion.

10. The multidirectional wheel as in claim 9, wherein the protrusion is lobe shaped.

11. The multidirectional wheel as in claim 9, wherein the protrusion is flat shaped.

12. The multidirectional wheel as in claim 9, wherein the protrusion is taper shaped.

13. The multidirectional wheel as in claim 1, wherein there are two hubs defining the first axial direction of rotation and wherein the at least one magnet comprises a disk disposed between the two hubs.

14. The multidirectional wheel as in claim 13, wherein the brackets are disposed about each of the two hubs.

15. The multidirectional wheel as in claim 14, wherein the brackets disposed about each of the two hubs, the hubs, and the magnet collectively define a concave profile.

16. The multidirectional wheel as in claim 14, wherein the brackets disposed about each of the two hubs, the hubs, and the magnet collectively define a convex profile.

17. The multidirectional wheel as in claim 14, wherein the brackets disposed about each of the two hubs, the hubs, and the magnet collectively define a flat profile.

18. The multidirectional wheel as in claim 13, further comprising a motor wherein at least one of the two hubs is operationally coupled to the motor for driven rotation.

19. The multidirectional wheel as in claim 18, further comprising an axle operationally coupled to the motor and the at least one of the two hubs.

20. A multidirectional wheel for traversing a surface having a contour, comprising:
   at least one hub, the at least one hub defining a first axial direction of rotation;
   at least one magnet having an outer face arranged to generally circumscribe the first axial direction, wherein the hub is made of a magnetically inducible material which directs the flux of the at least one magnet toward the surface being traversed;
   a plurality of magnetically inducible brackets disposed around an entirety of a radial outer periphery of the at least one hub, the brackets being sized and shaped to define a wheel profile that complements the contour of the surface such that the size of an air gap is reduced as compared to a wheel profile that does not complement the contour of the surface at each rotational position of the wheel;
   a plurality of fasteners adapted to removably couple the each of the plurality of magnetically inducible brackets to the radial outer periphery of the at least one hub; and
   a plurality of rollers supported for rotation by the plurality of brackets, the rollers being supported by the brackets for rotation in a second axial direction that is at an angle to the first axial direction,
   wherein at least one roller contacts the surface in any rotational position of the wheel as the wheel traverses the surface while defining the air gap between the surface and the outer face of the magnet, the hub, and the brackets, and
   wherein the plurality of magnetically inducible brackets includes a first plurality of brackets having a first size and shape adapted for installation on the wheel and complementing the contour of the surface when the contour is convex, and a second plurality of brackets interchangeable with the first plurality of brackets having a second size and shape and adapted for installation on the wheel and complementing the contour of the surface when the contour is concave, the first and second plurality of brackets being removably coupled to the radial outer periphery of at least one hub via the fasteners.

* * * * *